April 12, 1949.　　　C. F. SHEELEY　　　2,467,161
CONTROL FOR CUTTING APPARATUS
Filed Aug. 27, 1946　　　2 Sheets-Sheet 1

INVENTOR.
CHARLES F. SHEELEY
BY Hammond & Littell
ATTORNEYS

April 12, 1949.
C. F. SHEELEY
2,467,161
CONTROL FOR CUTTING APPARATUS
Filed Aug. 27, 1946
2 Sheets-Sheet 2
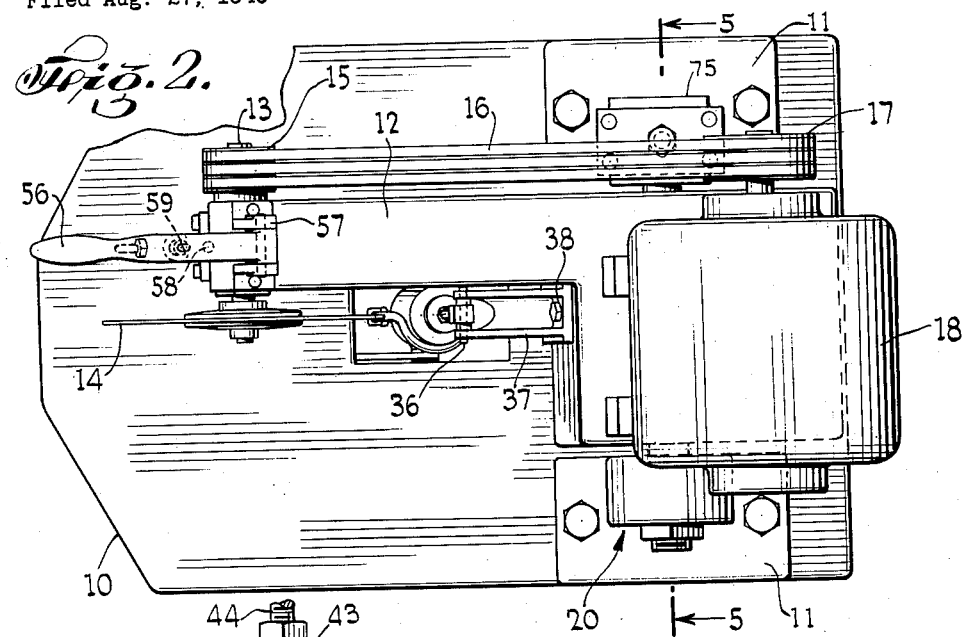
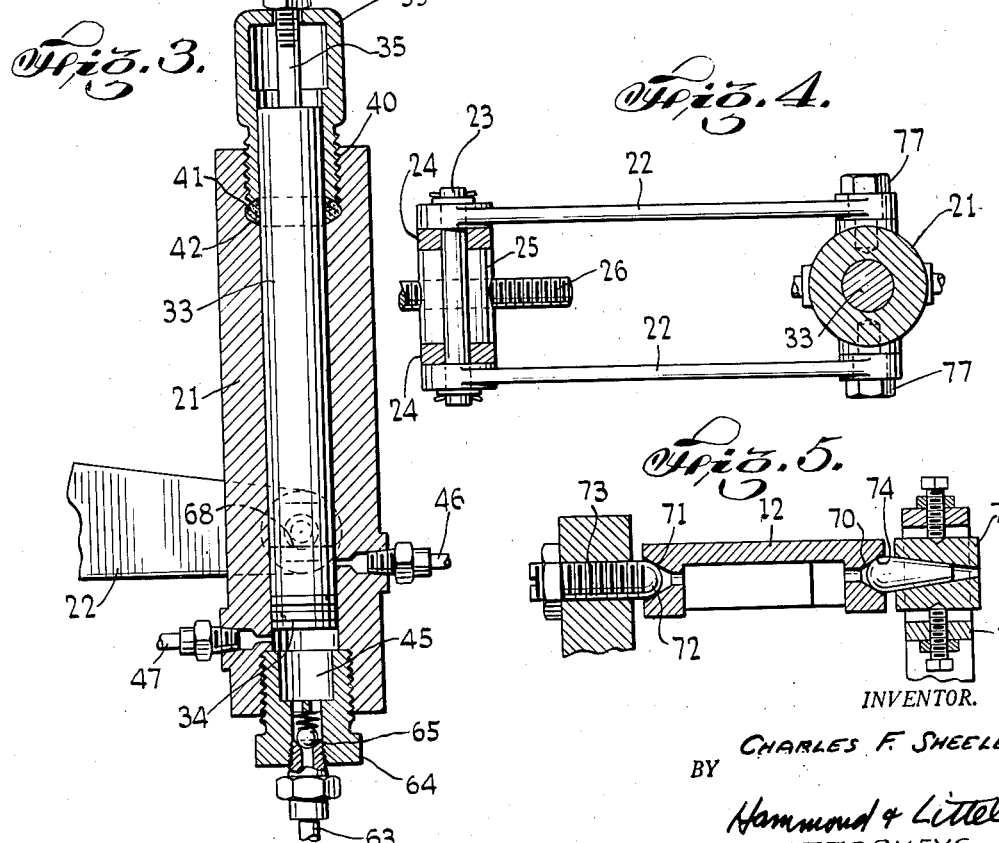
INVENTOR.
CHARLES F. SHEELEY
BY
Hammond & Littell
ATTORNEYS Patented Apr. 12, 1949

2,467,161

UNITED STATES PATENT OFFICE 2,467,161

CONTROL FOR CUTTING APPARATUS

Charles F. Sheeley, East Orange, N. J., assignor of one-half to Robert E. Joy, Freeport, N. Y.

Application August 27, 1946, Serial No. 693,300

11 Claims. (Cl. 51—98)

This invention relates to cutting machines and particularly to a control means for governing movement of a tool relative to a piece of work to be operated upon by said tool.

In previous rotating disc tool machines, it has been difficult to control in a simple manner the speed of advance of the tool toward and into the work after the cutting action is started. Such a speed control should be adjustable with ease to accommodate various sizes of work.

One of the objects of the invention is to control speed of movement of the tool toward the work so that the approach can be at a relatively rapid rate and the cutting movement at a much slower rate.

Another object is to provide a means to automatically hold the tool in an inoperative position after having been manually lifted away from the work following a cutting operation.

Still another object of the invention is to provide means for adjusting with ease the point where the control mechanism changes the speed of the tool movement and where the tool is stopped upon completion of a cut so that various size pieces of work may be accommodated in a machine equipped with the invention.

These and other features, objects, and advantages of the invention will become apparent from the following description and drawings.

In the drawings:

Fig. 2 is a plan view of the apparatus of Fig. 1.

Fig. 3 is an enlarged sectional view of one form of hydraulic cylinder.

Fig. 4 is a view along the line 4—4 of Fig. 1.

Fig. 5 is a sectional view along the line 5—5 of Fig. 2 of one type of bearing that may be used for a pivot arm.

Figure 1:
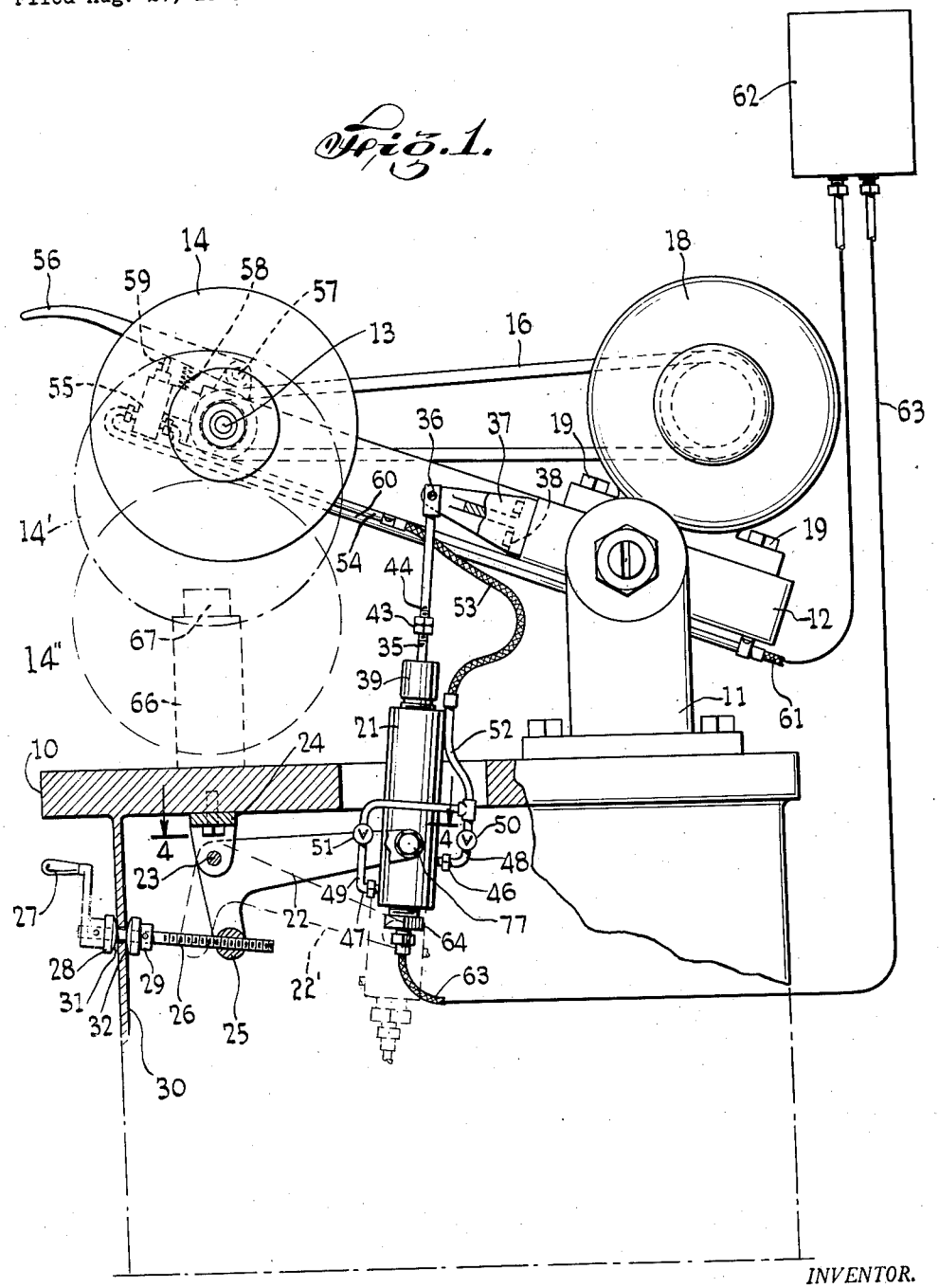
Fig. 1 is a broken vertical view partially in section.

The invention is particularly useful on a machine having a rotary type tool such as a saw or an abrasive disc.

In accordance with the present invention, a hydraulic control valve is provided which can be released so that the tool support will advance with the tool toward the work. The arrangement is such that the hydraulic flow rate during movement toward the work is changed so that about the time the tool contacts the work, the tool support movement is retarded. Upon completion of the cutting operation, the tool support can be raised upwardly and will lock itself automatically in a retracted or upper position.

In a preferred embodiment, frame 10 has brackets 11 mounted thereon, said brackets carrying pivots 26 for the pivoted swingable tool support 12. The outer end of support 12 carries a spindle 13 upon which may be mounted a rotatable disc-like tool 14. Pulley 15 (Fig. 2) is connected by means of belt 16 to motor driven pulley 17, motor 18 being mounted by means of bolts 19 (Fig. 1) to the pivoted tool support 12 in any well-known manner.

As will be explained hereafter, any type of adjustable pivot bearing shown generally at 20 may be used for holding the tool support 12, a preferred form being shown in Fig. 5.

In some previous devices, the pivoted tool support 12 has been counter-balanced in some manner and has been operable so as to bring the tool manually into engagement with the work. Upon completion of the cutting operation in such devices, the tool has been lifted away from the work so that a new piece could be inserted.

Hydraulic cylinder 21 is supported on adjustable bell cranks 22, said bell cranks being pivotally mounted on shaft 23 and supported by brackets 24 (Figs. 1 and 4) carried by frame 10. A nut 25 is oscillatably mounted between the short ends of the bell cranks and said nut is engaged by an adjusting screw 26, said adjusting screw being turnable by manually operated crank handle 27. Spacers 28 and 29 are pinned to screw 26 and serve to hold the adjusting screw 26 longitudinally relative to the front wall 30 of the frame 10 of the machine. The spacers have spherical surfaces 31 and 32, respectively, so as to allow for the slight rocking action of adjusting screw 26 as bell crank lever is oscillated about pivot 23. The cylinder 21 is pivotally mounted by bolts 77 to the long ends of bell cranks 22. Piston 33 is slidable in hydraulic cylinder 21, said piston being provided with rings 34 in a conventional manner or other type of packing means. The upper end of piston 33 carries a connecting rod 35, said rod being pivotally mounted at 36 to bracket 37, said bracket in turn being fastened by bolts 38 to pivoted tool support 12. Closure member 39 is screw threadedly engaged at 40 with the upper end of cylinder 21, there being a suitable packing 41 provided between the ends of closure 39 and the bottom 42 of the enlarged bore at the upper end of cylinder 21. Adjusting nuts 43 are provided on the screw threaded portion 44 of the connecting rod 35 to limit the motion of the piston and tool support inwardly relative to the cylinder. The fluid outlets from the fluid end 45 of cylinder 21 are controlled by a first fluid outlet 46 and a lower or second outlet 47, the spacing of the outlets being correlated to each other and the cylinder according to the particular machine involved.

Pipes 48 and 49 are connected through valves 50 and 51 to a pipe 52. Pipe 52 is connected by means of flexible lead 53 to pipe 54 mounted on tool support 12, said pipe 54 leading to control valve 55, said valve being controlled by means of a hand control lever 56. The hand control lever 56 is pivotally mounted at 57 on tool support 12, spring 58 normally holding said hand control lever in an upper position so that valve plunger 59 is in an extended or closed valve position. Outlet from valve 55 is led through pipe 60 and flexible connection 61 to reservoir 62, said reservoir being above the level of cylinder 21. Pipe 63 is connected to the inlet end 64 of hydraulic cylinder 21, there being a ball check valve or one way valve arrangement 65 located in connector 64 serving to admit fluid into the cylinder but serving to prevent fluid from passing out through pipe 63 and returning to the reservoir 62.

When the pivoted arm 12 is in its upper or inoperable position, the weight of the arm will be transmitted through connecting rod 35 to piston 33. Inasmuch as valve 55 is closed, fluid cannot escape from cylinder outlets 46 and 47, and the arm will remain in its upper position. The ball check valve 65 prevents fluid from passing out of the cylinder. A piece of work to be operated upon is indicated diagrammatically at 67 and held in some suitable manner on work holder 66. Hand control lever 56 is pressed downwardly which will open valve 55 allowing fluid to bow through pipe 52 from fluid outlets 46 and 47. At this time, the piston is in an upper part of the cylinder as indicated by the dot-dash line 68 (Fig. 3) so that both inlets 46 and 47 are open. The position of inlet 46 is arranged so that when the cutting wheel 14 starts to enter the work, the lower end of piston 33 will cut off flow from the first fluid outlet 46. During the cutting portion of the stroke as the piston proceeds downwardly in the cylinder, fluid will flow through outlet 47 only so that the rate of speed will be slower than when both fluid outlets 46 and 47 are open.

The adjusting handle 27 may be turned so as to move bell crank lever 22 to raise or lower hydraulic cylinder and thereby position outlet 46 relative to the piston at the desired location for the change in approach speed of the tool. The lower limit of movement of the pivoted tool support, and therefore the rotating tool 14, is governed by the position of adjusting nuts 43, said nuts upon engagement with guide 39 serving to stop the downward movement of the piston above the second or lower fluid outlet 47. When it is desired to raise the piston, handle 56 is grasped and the tool support and tool lifted upwardly. Fluid will flow from reservoir 62 through pipe 63 and check valve 65 into the cylinder 21. When the handle 56 is released, ball check valve 65 will close so that the pivoted tool support will be held in its upper or inoperable position inasmuch as liquid will not be able to escape from cylinder 21.

The broken lines at 14' show the wheel after it has completed a cut through the work shown diagrammatically at 67, there being suitable clearance means provided in the work holder 66. The dashed lines at 14" show the travel of the wheel that might be utilized with a different kind of work holder or larger work. The broken lines at 22' indicate a lowered position of the cylinder to lower the point where the piston first covers the upper fluid opening 46 to change the speed of the tool advance.

One form of pivoted support that might be used for the tool support 12 is shown in Fig. 5, wherein the pivoted arm 12 has conically shaped depressions 60 and 71. A spherically shaped pivot point 72 may be carried by adjustable bolt 73 on one of the brackets carrying the tool support 12. A similar spherically shaped pivot 74 may be mounted in 75 carried by the other bracket 76. The plate 75 may have four adjusting screws located at right angles so as to adjustably position plate 75 and thereby make it possible to change the center line of the tool support pivot arrangement. In this way, the exact position of the cutting wheel 14 may be accurately adjusted.

The invention is particularly adaptable for installation on rotary disc-type cutting tools. Variations may be made in the construction and details shown without departing from the spirit of the invention as defined in the appended claims.

What is claimed:

1. Apparatus for controlling the feed of a rotary disc tool or the like including a pivoted tool support oscillatable toward and away from a piece of work, a rotary disc tool mounted on said support, means to drive said tool, a hydraulic means connected with and governing the pivoting movement of said tool relative to said work, and hydraulic flow control means connected with said hydraulic means normally holding said tool support in an inoperative position and openable to allow movement of the tool support toward the work, said control means having outlets therefrom operable to change the movement of said hydraulic means and tool support from a fast to a slow rate at a predetermined point in the travel of said tool toward the work.

2. Apparatus for controlling the feed of a rotary disc-like tool including a pivoted tool support oscillatable toward and away from a piece of work to be operated upon by said tool, a hydraulic cylinder means connected to said support and normally resisting the movement of said tool support towards the work, hydraulic flow control means connected with said hydraulic cylinder for changing the speed of movement of said hydraulic means after movement of the hydraulic means has been started at a predetermined point in the travel of said tool support toward said work, and adjusting means connected with said hydraulic cylinder means for moving said hydraulic cylinder means relative to said support to change the predetermined point where the speed of the tool support is changed by the hydraulic flow control means.

3. Apparatus for controlling the feed of a rotary disc-like tool including a tool support oscillatable toward a piece of work to be operated upon by said tool, a hydraulic means holding said support and tool in a predetermined inoperative position, and hydraulic flow control means normally closed and openable to allow fluid flow in said hydraulic means so that the support can pivotally move toward the work, said flow control means having means changing the tool feed from a fast rate at the beginning of operation thereof to a predetermined slower rate at a predetermined point in the travel of said tool toward the work approximately before the point where the tool engages the work.

4. Apparatus for controlling the feed of a rotary disc-like tool including a pivoted tool support advanceable toward a piece of work, a hydraulic cylinder controllable by a fluid flowable therethrough, a piston movable in said cylinder for governing movement of said tool support, a pair of spaced fluid outlets in said cylinder, and a control valve for said fluid outlets, said valve normally being closed to prevent movement of the tool support said piston being movable at a fast rate of speed when said control valve is first opened to allow fluid to flow from both of said outlets and at a slower rate of speed after said piston has moved in said cylinder a predetermined distance to cut off fluid flow from one of said outlets.

5. Apparatus for controlling the feed of a rotary disc-like tool including a pivoted tool support movable toward a piece of work, a hydraulic cylinder and piston movable therein for governing movement of said support toward a piece of work located in the path of the tool, a pair of spaced fluid outlets in the wall of said cylinder, and a control valve connected with said fluid outlets adapted to control the flow of fluid therefrom, said piston being movable at a fast rate of speed under the urgence of said tool support when said control valve is opened to allow fluid to flow from both of said outlets, and at a slower rate of speed after said piston has moved in said cylinder a predetermined distance to cut off fluid flow from one of said outlets at a predetermined point of travel of the tool toward the work.

6. Apparatus for controlling the feed of a rotary disc-like tool including a pivoted tool support oscillatable relative to a piece of work, a hydraulic fluid cylinder and piston slidable therein for governing movement of said support, a check controlled inlet connection at one end of said cylinder, a pair of spaced fluid outlets in said cylinder wall, a control valve for said fluid outlets adapted to control the flow of fluid from said outlets, said piston being movable at a fast rate of speed when said control valve is first opened to allow the flow of fluid from said outlets and at a slower rate of speed after said piston has moved in said cylinder a predetermined distance to cut off fluid flow from one of said outlets, and a fluid reservoir connected to said cylinder inlet connection and to said outlets.

7. Apparatus for controlling the feed of a rotary disc-like tool including a pivoted tool support movable toward a piece of work, a hydraulic cylinder and piston slidable therein for governing movement of said support, a pair of spaced fluid outlets in the wall of said cylinder, and a control valve having an operating member mounted on said pivoted tool support controlling the flow from said fluid outlets and normally preventing flow therefrom, said valve allowing fluid flow to take place upon operation of said member so that the tool support will commence movement of the tool toward the work, said piston being movable at a fast rate of speed when said control valve is first operated and at a slower rate of speed after one of said outlets has been cut off by said piston.

8. Apparatus for controlling the feed of a rotary disc-like tool including a tool support movable toward a piece of work, a hydraulic cylinder and piston slidable therein for governing movement of said support, a pair of spaced outlets for said cylinder, fluid control means for said outlets, said piston being movable at a fast rate of speed when said control means is first actuated and at a slower rate of speed after said piston has moved in said cylinder a predetermined distance to cut-off fluid flow from one of said outlets, and means to adjust the position of said cylinder relative to said support so as to adjust the location of the first of said outlets relative to said piston and thereby the point of change of speed of said piston in said cylinder.

9. Apparatus for controlling the feed of a rotary disc-like tool including a tool support movable toward a piece of work, a hydraulic cylinder and piston movable therein for governing movement of said support, a pair of spaced outlets, fluid control means for said outlets, said piston being movable at a fast rate of speed when said control means is first opened and at a slower rate of speed when fluid flow is cut-off from one of said outlets at a predetermined point of travel of the tool toward the work, and adjustable means associated with said piston to stop the same at a predetermined point and thereby limit the movement of said tool support relative to the work.

10. Apparatus for controlling the feed of a rotary disc-like tool including a frame, a pivoted tool support adjustable toward a piece of work on said frame, a hydraulic cylinder and piston slidable therein for governing movement of said support, said cylinder and piston being connected between said tool support and said frame, a pair of spaced outlets, fluid control means for said outlets, said piston being movable at one rate of speed when both of said outlets are opened and at a slower rate of speed when a first of said outlets is rendered ineffective by said piston, means for adjusting the position of said cylinder on said frame so as to change the point at which said piston renders said first outlet ineffective, and adjusting means to limit the movement of said piston relative to said cylinder and thereby limit the movement of said tool support relative to the work.

11. Apparatus for controlling the feed of a rotary disc-like tool including a frame, a pivoted tool support having an adjustable pivot and oscillatable relative to a piece of work on said frame a hydraulic cylinder and piston slidable therein for governing movement of said support, said cylinder and piston being connected between said tool support and said frame, a pair of spaced outlets, fluid control means for said outlets, said piston being movable at one rate of speed when both of said outlets are opened and at a slower rate of speed when a first of said outlets is rendered ineffective by said piston, means for adjusting the position of said cylinder on said frame so as to change the point at which said piston renders said first outlet ineffective, and adjusting means to limit the movement of said piston relative to said cylinder and thereby limit the movement of said tool support relative to the work.

CHARLES F. SHEELEY.

REFERENCES CITED

The following references are of record in the file of this patent:

UNITED STATES PATENTS

| Number | Name | Date |
|---|---|---|
| 786,509 | Merritt | Apr. 4, 1905 |
| 2,142,022 | Ernst et al. | Dec. 27, 1938 |
| 2,157,946 | Wortendyke | May 9, 1939 |
| 2,262,049 | Robinson | Nov. 11, 1941 |
| 2,354,509 | Dreher | July 25, 1944 |
| 2,360,070 | Meyerbach | Oct. 10, 1944 |
| 2,361,961 | Pruitt | Nov. 7, 1944 |

Certificate of Correction

Patent No. 2,467,161.  April 12, 1949.

CHARLES F. SHEELEY

It is hereby certified that error appears in the printed specification of the above numbered patent requiring correction as follows:

Column 3, line 34, for the word "bow" read *flow*;

and that the said Letters Patent should be read with this correction therein that the same may conform to the record of the case in the Patent Office.

Signed and sealed this 27th day of September, A. D. 1949.

[SEAL]

THOMAS F. MURPHY,
*Assistant Commissioner of Patents.*